United States Patent [19]

Jin et al.

[11] Patent Number: 5,304,909
[45] Date of Patent: Apr. 19, 1994

[54] RESOLVER EXCITATION SIGNAL GENERATING APPARATUS

[75] Inventors: Sang-Hyun Jin; Sang-Gwon Lim, both of Suwon; Jin-Won Lee, Seoul, all of Rep. of Korea

[73] Assignee: Samsung Electronics Co., Ltd., Suwon, Rep. of Korea

[21] Appl. No.: 824,534

[22] Filed: Jan. 23, 1992

[30] Foreign Application Priority Data

Jan. 26, 1991 [KR] Rep. of Korea .................. 91-1346

[51] Int. Cl.$^5$ .................. G05B 19/31; H02P 5/16
[52] U.S. Cl. .................. 318/661; 318/660; 318/636; 340/870.34
[58] Field of Search .................. 318/560–686, 318/690–723, 138, 754, 721, 798; 375/53; 310/26; 340/870.25, 870.34, 870.18, 870.19, 870.31

[56] References Cited

U.S. PATENT DOCUMENTS

| | | | |
|---|---|---|---|
| 3,622,851 | 11/1971 | Hanada | 318/138 |
| 3,754,175 | 8/1973 | Girault | 318/138 |
| 3,872,369 | 3/1975 | Rich | 318/603 |
| 3,936,954 | 2/1976 | Anderson et al. | 318/661 |
| 4,010,463 | 3/1977 | Kay | 318/661 X |
| 4,056,761 | 11/1977 | Jacoby et al. | 310/26 X |
| 4,135,120 | 1/1979 | Hoshimi et al. | 318/138 |
| 4,199,800 | 4/1980 | Weit | 318/661 X |
| 4,320,391 | 3/1982 | Mallett | 318/605 |
| 4,353,016 | 10/1982 | Born | 318/254 |
| 4,357,569 | 11/1982 | Iwakane et al. | 318/721 |
| 4,358,722 | 11/1982 | Iwakane et al. | 318/661 |
| 4,358,726 | 11/1982 | Iwakane et al. | 318/798 |
| 4,492,902 | 1/1985 | Ficken et al. | 318/254 |
| 4,511,884 | 4/1985 | Serer et al. | 318/660 |
| 4,535,276 | 8/1985 | Yokobori | 318/254 |
| 4,608,524 | 8/1986 | Yokobori | 318/254 |
| 4,682,090 | 7/1987 | Schmidt et al. | 318/661 |
| 4,841,165 | 6/1989 | Bowles | 318/599 X |
| 4,972,186 | 11/1990 | Morris | 318/661 |
| 5,025,455 | 6/1991 | Nguyen | 375/53 |
| 5,075,612 | 12/1991 | Margaris | 318/807 |

*Primary Examiner*—Paul Ip
*Attorney, Agent, or Firm*—Burns, Doane, Swecker & Mathis

[57] ABSTRACT

The present invention relates to a resolver excitation signal generating apparatus for supplying a reference excitation signal to a resolver attached to a motor for driving a robot or a computer numerical control machine. When a sine-wave signal is transferred from a signal generator to the resolver, the signal is filtered by a low pass filter, amplified up to the rated voltage by means of a line driver and supplied to the resolver, thereby allowing the position of the motor to be controlled exactly.

7 Claims, 3 Drawing Sheets

RESOLVER EXCITATION SIGNAL GENERATING APPARATUS

BACKGROUND OF THE INVENTION

1. Field of the Invention

The present invention relates to a resolver for detecting positional information of a motor, more particularly, to a resolver-excitation signal generating apparatus for generating a reference excitation signal to be supplied to a resolver.

2. Description of the Prior Art

In general, a resolver has been known as a sensor capable of obtaining information relative to a position of a motor only when external reference signal is supplied thereto, from the viewpoint of a mechanical structure. Recently, a motor attached with such a resolver has been employed to control a position of automatic systems, such as a robot, a computer numerical control machine and the like.

Referring to FIG. 1, there is shown a conventional signal generating apparatus for supplying a reference signal to the resolver, described in, for example, U.S. Pat. No. 4,342,077.

Now, the operation of the conventional signal generator will be described in detail.

First, a clock signal having a predetermined frequency generated by an oscillator 1 is supplied to an address decoder 2 which converts the signal having a predetermined frequency into address data of a ROM table 3, for example, such as an EPROM (erasable and programable read only memory). Accordingly, sine and cosine digital data can periodically be output from the ROM table 3 and converted into analog values by means of a digital to analog converter 4. Thus, the digital to analog converter 4 produces the output signal to be supplied to the resolver through a line driver 5.

With the conventional construction as described above, however, there problems that the apparatus is high in price due to an increase in the number of parts such as the address decoder, ROM table, digital to analog convertor etc, and hence maintaining the apparatus is considerably difficult.

SUMMARY OF THE INVENTION

Accordingly, the present invention has been made in consideration of the above-mentioned problems and an object of the present invention is to provide a resolver-excitation signal generating apparatus which can supply a reference excitation signal to a resolver for determining a position of a motor by using a signal generator, thereby decreasing the number of parts, reducing the expenses and ensuring simplicity of maintenance.

In order to achieve the above-mentioned objects, the present invention provides a resolver-excitation signal generating apparatus, the apparatus comprising: a signal generator for generating a reference excitation signal; a low pass filter for removing harmonic components contained in the signal generated by the signal generator; and, a line driver for retaining the harmonic component-removed signal by the low pass filter at a normal signal level without attenuation of the signal.

The above and other objects, features and advantages of the present invention will be apparent from the following description to be understood with reference to the accompanying drawings.

DETAILED DESCRIPTION OF THE PREFERRED EMBODIMENTS

A preferred embodiment of the present invention will be described hereinafter.

Figure 1:
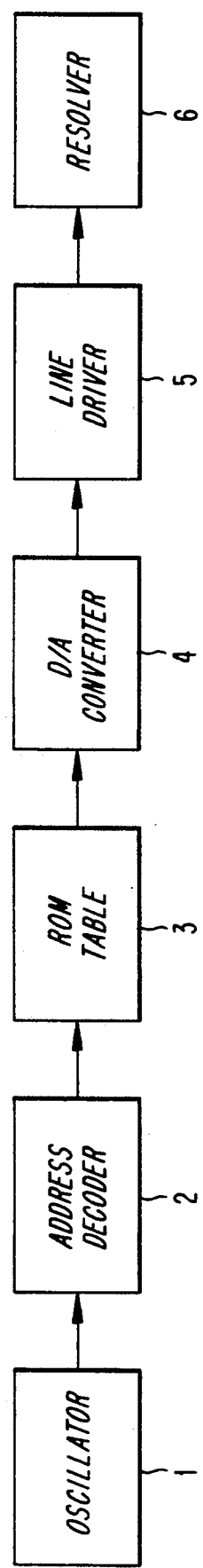
FIG. 1 is a block diagram of a conventional resolver-excitation signal generating apparatus.
Figure 2:
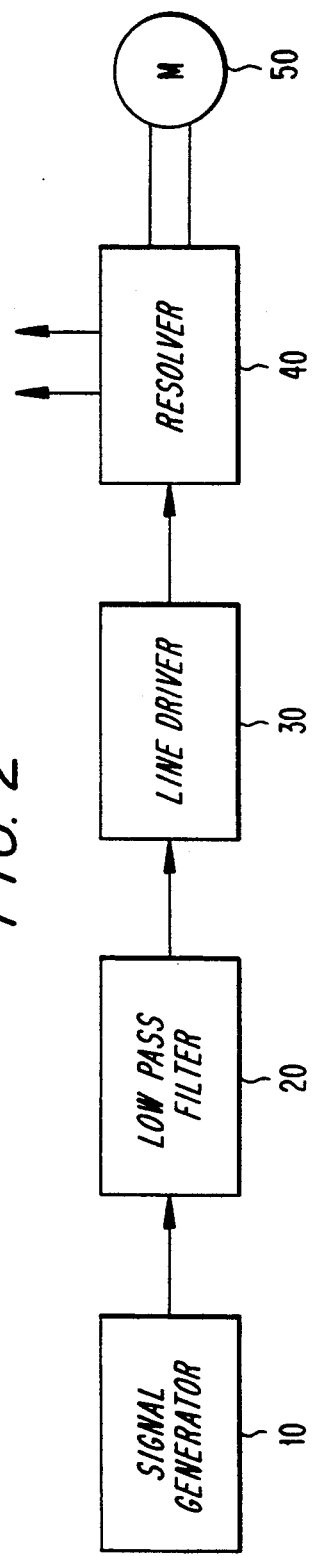
FIG. 2 is a block diagram of a resolver-excitation signal generating apparatus according to a preferred embodiment of the present invention.
Figure 3:
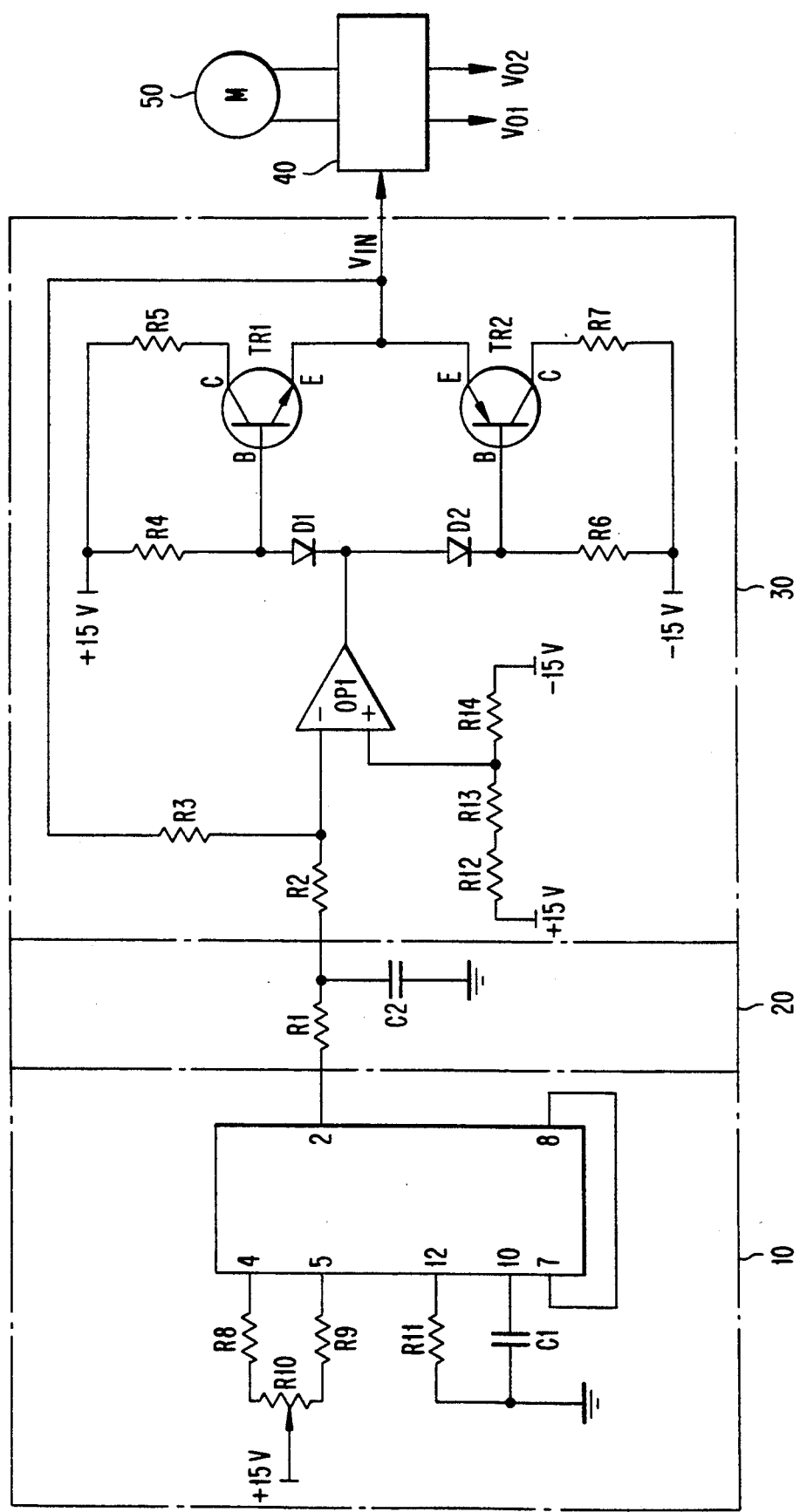
FIG. 3 is a circuit diagram showing in detail the apparatus in FIG. 2.
Figure 5:
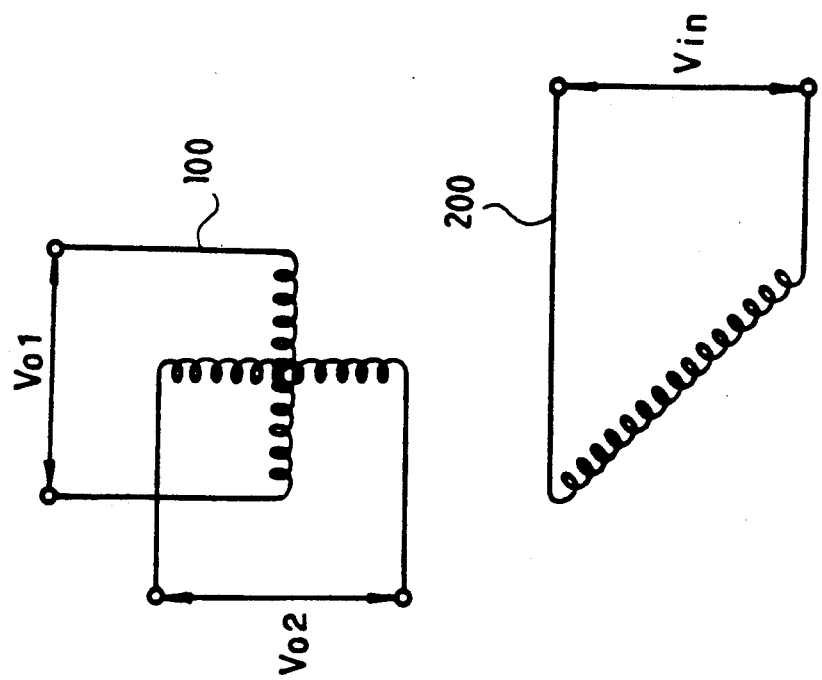
Figure 4:
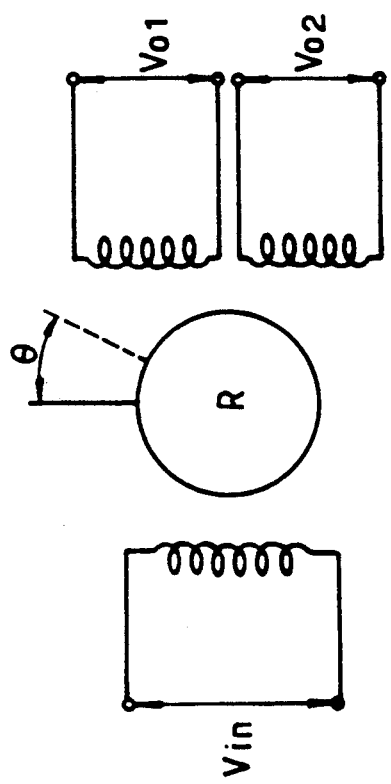
FIG. 4 is a view showing the coil-windings of a resolver according to the present invention; and, FIG. 5 is a view showing a structure of the resolver applied to the present invention.

FIG. 2 is a block diagram of a resolver-excitation signal generating apparatus according to the present invention, FIG. 3 is a detailed circuit diagram of the apparatus in the FIG. 2, FIG. 4 is a view showing a structure of the resolver used for explaining a relation of the induced voltage of the resolver, and FIG. 5 is a view showing the coil-windings of the resolver applied to the present invention.

Referring to FIGS. 2 and 3, reference numeral 10 denotes a signal generator for generating a reference excitation signal to be supplied to a resolver 40 serving as a position sensor of a motor in designing an A.C servo motor driver. The signal generator 10 may be, for example, an ICL 8038 chip commercially obtainable from Intel Co., Ltd.

Reference numeral 20 denotes a low pass filter for removing harmonic components contained the sine-wave signal generated by the signal generator 10. The low pass filter 20 includes a resistor R1 connected to a pin 2 of the signal generator 10 and a capacitor C2 having one end connected to the resistor R1 and the other end connected to a ground.

Reference numeral 30 denotes a line driver for preventing the output signal of the signal generator 10 from being attenuated when the signal is inputted from the signal generator 10 to the resolver 40. The line driver 30 includes an operational amplifier OP1 (hereinafter, referred as OP amplifier) having an inversion input terminal (−) connected with a connection node between a resistor R2 and a resistor R3 connected to a connection node of the resistor R1 and the capacitor C2 of the low pass filter 20, and a non-inversion input terminal (+) connected to resistors R12, R13 and R14.

Furthermore, the OP amplifier OP1 has an output terminal connected to a connection node between a cathode of a diode D1 and an anode of a diode D2. A transistor TR1 is connected at its base B to a connection node between the diode D1 and a resistor R4. A transistor TR2 is connected at its base B to a connection node between the diode D2 and a resistor R6.

The transistor TR1 is connected at its collector C to a resistor R5, and the transistor TR2 is connected at its collector C to a resistor R7. The transistors TR1 and TR2 are connected at a common node of emitters E and E to the resolver 40, so that the signal generated by the signal generator 10 is supplied to the resolver 40.

Since the signal generator 10 is arranged away from the resolver 40, the line driver 30 according to the present invention is preferably constructed in a push-pull fashion to prevent attenuation of the signal transferred from the signal generator 10 to the resolver 40.

The resolver-excitation signal generating apparatus according to the present invention can supply the reference excitation signal to the resolver 40, and obtain two output signals with respect to the position of the motor 50, as shown in FIG. 4.

That is, the resolver 40 is formed in a 1-phase input and 2-phase output fashion and comprises a stator 100 and a rotor 200 as shown in FIG. 5. Therefore, if a reference excitation signal is input to the rotor 200, then two output signals are output from the stator 100.

The relation between the two output signals and the reference excitation signal generated by the signal generator 10 can be expressed in the following equations:

$$Vin = E \sin \omega t \quad (1)$$

$$V01 E \sin \omega t \sin\theta \quad (2)$$

$$V02 E \sin \omega t \cos\theta \quad (3)$$

Wherein, Vin denotes a resolver-excitation reference signal, V01 and V02 denote the output signals of the resolver 40, and $\omega$ denotes angular velocity ($=2\pi$ f).

Accordingly, the positional information of the motor 50 can be obtained from the equations (1), (2) and (3).

Meanwhile, the frequency of the signal generated from the signal generator 10 can be obtained by the following equation: $f=0.3/2\pi R$ C1 [Hz] herein, R8=R9=R. The sine-wave signal thus generated contains the harmonic components. Accordingly, the harmonic components are removed by the low pass filter 20 including the resistor R1 and the capacitor C2, and the sine-wave signal with the harmonic components thus removed is input to the line driver 30.

When a positive (+) signal of the sine-wave signal is input to the line driver 30, the diode D2 is forward biased while the diode D1 is reversed biased. Accordingly, the diode D2 is turned on and the diode D1 is turned off. On the other hand, when a negative (−) signal of the sine-wave signal is input to the line driver 30, the diode D2 is reversed biased while the diode D1 is forward biased. Accordingly, the diode D2 is turned off and the diode D1 is turned on. As a result, the OP amplifier OP1 of the line driver 30 is operated as an inversion amplifier.

More particularly, the signal of the signal generator 10 is amplified by using the Op amplifier OP1 serving as an inversion amplifier and the amplified signal is supplied to the transistors (TR1, TR2) to amplify the signal up to the rated voltage, which is input to the resolver 40. Next, the amplified voltage is applied to the resolver 40. Accordingly, two positional signals are output from the resolver 40 to a resolver-digital converter (not shown), thereby the position of the motor 50 is detected on the basis of the two positional signals from the resolver 40.

As described above, according to the resolver-excitation signal generating apparatus of the present invention, the reference excitation signal of the resolver is generated by using the signal generator to accurately control the postion of the motor, thereby decreasing the number of parts, reducing the expenses and ensuring simplicity of maintenance.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A resolver-excitation signal generating apparatus for generating an excitation signal of a resolver attached to a motor, said apparatus comprising:

a signal generator for generating a one-phase reference excitation signal;

a low pass filter for removing harmonic components contained in the one-phase reference signal generated by said signal generator to obtain a harmonic component-removed signal; and a line driver for the harmonic component-removed signal at a normal signal level without attenuation of the harmonic component-removed signal, said line driver comprising a plurality of amplifiers and feed-back circuit means connected between one input of a first amplifier and an output of a last amplifier of said plurality of amplifiers.

2. A resolver-excitation signal generating apparatus according to claim 1 wherein said one-phase reference excitation signal is a sine-wave reference excitation signal.

3. A resolver-excitation signal generating apparatus according to claim 1, wherein said line driver is formed in a push-pull fashion and amplifies the one-phase reference excitation signal generated from said signal generator up to the rated voltage to be applied to said resolver.

4. The resolver excitation signal generating apparatus according to claim 1, wherein said resolver is formed in 1-phase input and 2-phase output fashion.

5. An apparatus for generating a corrected reference excitation signal for a position detector comprising:

means for generating a one-phase reference excitation signal;

means for removing harmonic components from the one-phase reference excitation signal; and means for compensating for attenuation of the reference excitation signal in reaction to the removing means, said compensating means comprising a plurality of amplifiers and feed-back circuit means connected between one input of a first amplifier and an output of a last amplifier among the plurality of amplifiers.

6. The apparatus according to claim 5 wherein the one-phase reference excitation signal is a sine wave signal.

7. The apparatus according to claim 5 wherein said preventing means is a push-pull device.

* * * * *